(12) United States Patent
Sabhapathy

(10) Patent No.: US 9,127,648 B2
(45) Date of Patent: Sep. 8, 2015

(54) SYSTEM TO COOL THE NACELLE AND THE HEAT GENERATING COMPONENTS OF AN OFFSHORE WIND TURBINE

(75) Inventor: Peri Sabhapathy, Northville, MI (US)

(73) Assignee: GAMESA INNOVATION & TECHNOLOGY, S.L., Sarigurren (ES)

( * ) Notice: Subject to any disclaimer, the term of this patent is extended or adjusted under 35 U.S.C. 154(b) by 950 days.

(21) Appl. No.: 13/089,822

(22) Filed: Apr. 19, 2011

(65) Prior Publication Data

US 2012/0269625 A1 Oct. 25, 2012

(51) Int. Cl.
*F03D 3/00* (2006.01)
*F03D 11/00* (2006.01)

(52) U.S. Cl.
CPC ........... *F03D 11/005* (2013.01); *F05B 2240/95* (2013.01); *F05B 2260/205* (2013.01); *Y02E 10/722* (2013.01); *Y02E 10/726* (2013.01)

(58) Field of Classification Search
CPC ........ F01D 25/145; F01D 25/12; F01D 25/26
USPC ........... 415/2.1, 4.1, 175, 176, 177, 178, 108, 415/114, 913
See application file for complete search history.

(56) References Cited

U.S. PATENT DOCUMENTS

| | | | |
|---|---|---|---|
| 6,439,832 B1 | 8/2002 | Siegfriedsen | |
| 6,520,737 B1 | 2/2003 | Fischer et al. | |
| 6,676,122 B1 * | 1/2004 | Wobben | 290/55 |
| 7,111,668 B2 | 9/2006 | Rurup | |
| 7,837,126 B2 | 11/2010 | Gao | |
| 8,092,151 B2 * | 1/2012 | Becker | 415/112 |
| 2009/0289461 A1 | 11/2009 | Larsen | |
| 2010/0008776 A1 * | 1/2010 | Larsen et al. | 416/39 |
| 2010/0061853 A1 | 3/2010 | Bagepalli | |
| 2011/0304149 A1 * | 12/2011 | Pasteuning et al. | 290/55 |

FOREIGN PATENT DOCUMENTS

| | | |
|---|---|---|
| CA | 2 714 839 A1 | 3/2011 |
| WO | 2010/069954 A1 | 6/2010 |

* cited by examiner

*Primary Examiner* — Edward Look
*Assistant Examiner* — Christopher J Hargitt
(74) *Attorney, Agent, or Firm* — Ladas & Parry LLP

(57) ABSTRACT

A system to cool the air inside a nacelle and the heat generating components housed in the nacelle of an offshore wind turbine is presented. An upper cooling circuit is disposed in the nacelle. A reservoir is disposed below the upper cooling circuit and has a lid that freely rotates about a vertical axis of the reservoir along with an inlet and an outlet pipe of the upper cooling circuit as the nacelle yaws, the vertical axis of the reservoir being coincident with a yaw axis of the nacelle. A lower cooling circuit is disposed below the reservoir. Coolant is circulated through the upper cooling circuit using a cooling pump disposed between the nacelle and the upper cooling circuit. The upper cooling circuit carries heat from the heat generating components and from the air inside the nacelle to the reservoir. The lower cooling circuit carries heat from the reservoir to the bottom of the tower and dissipates the heat to the sea water through a heat exchanger that is cooled by the sea water.

20 Claims, 4 Drawing Sheets

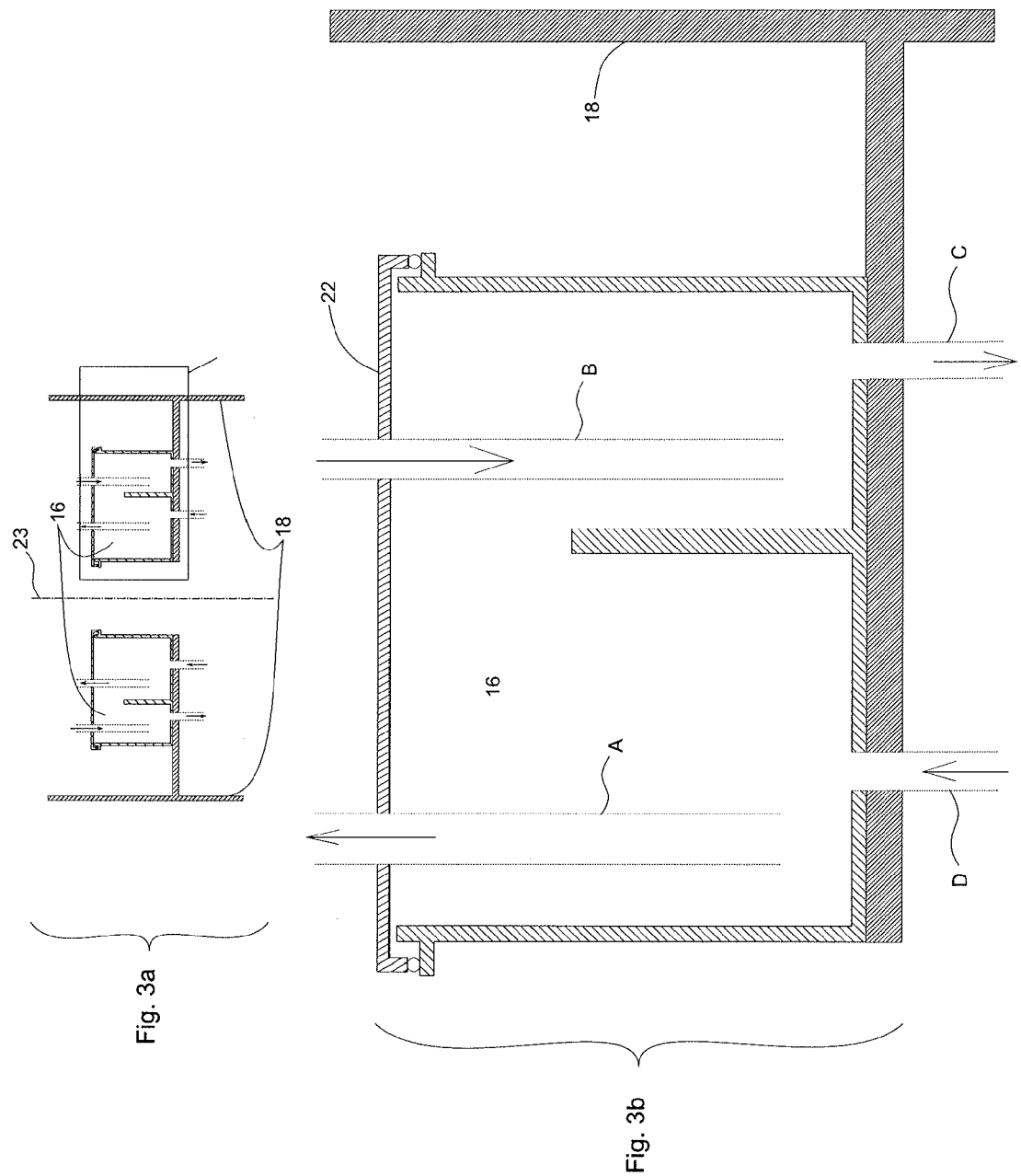

SYSTEM TO COOL THE NACELLE AND THE HEAT GENERATING COMPONENTS OF AN OFFSHORE WIND TURBINE

BACKGROUND OF THE INVENTION

1. Field of the Invention

The present invention generally relates to systems and methods to cool the nacelle and the heat generating components of an offshore wind turbine, with a provision to warm them before a cold start-up. More particularly, the present invention relates to a system to cool the air inside the nacelle and to cool the heat generating components such as the drivetrain, the electrical generator, the converter, and the transformer of an offshore wind turbine. The system can also be used to warm the air inside the nacelle and/or to warm one or more of these components before a cold turbine start-up.

2. Related Art

A wind turbine converts the kinetic energy of the wind into electrical energy through its rotor, drivetrain, electrical generator, and converter. An electrical transformer converts the low voltage output from the converter into a high voltage output before the output is sent to a substation at a wind farm. A wind turbine nacelle houses these mechanical and electrical components, namely, the drivetrain, the electrical generator, the converter, and the transformer (which is usually located in the nacelle to reduce power loss due to low voltage electrical transmission). The wind turbine nacelle also houses the components of the hydraulic system needed for blade pitching and nacelle yawing.

These components generate a significant amount of heat while the wind turbine is operating. For their protection and their efficient operation, the heat generated by such components has to be continuously removed. This is typically done by circulating a coolant through the heat exchangers built into these components. The coolant then transports the heat from these components and dissipates it to the ambient air with the help of air-cooled radiators mounted on the outside of the nacelle. The coolant can be any fluid that is typically used in low temperature heat exchangers, such as a mixture of ethylene glycol and water that does not freeze during cold weather. The heat generated by the drivetrain, and that by the hydraulic system, is dissipated to the coolant through liquid-to-liquid heat exchangers in the lubricating oil and the hydraulic fluid sumps, respectively.

In addition to dissipating the heat to the coolant, the wind turbine components also dissipate heat from their outer surfaces to the surrounding air. Components such as the transformer dissipate the heat primarily to the surrounding air. Thus, the air inside the nacelle needs to be either continuously replaced by fresh cooler air (an open airflow system) or cooled and re-circulated (a closed airflow system). In a turbine with an open airflow system, typically used in onshore turbines, the ambient air usually enters through one or more inlets at the nacelle bottom, and the warmer air exits to the outside through the outlets at the nacelle rear top. The outlet fans help the airflow through the nacelle and over the heat generating components. Thus, the ambient air is typically used as the heat sink to cool the heat generating components of a wind turbine.

SUMMARY OF THE INVENTION

In an offshore installation, because the sea water has a higher heat capacity and is typically at a lower temperature than the ambient air during the hot weather conditions, it is advantageous to use the sea water as the heat sink instead of the ambient air. This can be accomplished by circulating the coolant carrying the heat from the heat sources in the nacelle through a heat exchanger at the tower bottom that is cooled by the sea water. However, for capturing the maximum energy from the wind, the nacelle is continually yawed (rotated about a vertical axis) so that the rotor blades are oriented towards the wind direction. This interferes with the circulation of the coolant from the nacelle to any heat exchanger at the tower bottom.

The cooling system of the present invention can solve this problem effectively, and uses the sea water as the heat sink for dissipating the heat generated by the turbine components housed in the nacelle. Moreover, in an offshore environment, the ambient air has high humidity and carries water droplets and salt particles with it. Therefore, a closed airflow system such as the one disclosed by the present invention, where the heat from the air inside the nacelle is dissipated to the coolant through a liquid-to-air heat exchanger in the nacelle, can be more effective in preventing equipment corrosion and electrical short circuits than an open airflow system that is typically used onshore.

The present invention according to one aspect provides a system to cool the air inside a nacelle and the heat generating components housed in the nacelle in an offshore wind turbine. An upper cooling circuit is disposed in the nacelle. A coolant reservoir is positioned on a platform just below the lower part of the nacelle. The reservoir has a lid that freely rotates about the vertical axis of the reservoir along with an inlet pipe and an outlet pipe of the upper cooling circuit as the nacelle yaws, the vertical axis of the reservoir being coincident with a yaw axis of the nacelle. A lower cooling circuit is disposed below the reservoir. Coolant is circulated through the upper cooling circuit using a pump disposed in the nacelle. The upper cooling circuit carries heat from the heat generating components and from the air inside the nacelle to the reservoir. The lower cooling circuit carries heat from the reservoir to the bottom of the tower and dissipates the heat to the sea water through a heat exchanger that is cooled by the sea water.

The present invention according to another aspect provides a system to cool the air inside a nacelle and the heat generating components housed in the nacelle in an offshore wind turbine. An upper cooling circuit is disposed in the nacelle and is comprised of a plurality of independent cooling circuits each having an inlet pipe and an outlet pipe. A reservoir is disposed below the upper cooling circuit and has a lid that freely rotates about a vertical axis of the reservoir along with the inlet and outlet pipes of the upper cooling circuit as the nacelle yaws, the vertical axis of the reservoir being coincident with a yaw axis of the nacelle. A lower cooling circuit is disposed below the reservoir. Coolant is circulated through the upper cooling circuit by a plurality of cooling pumps respectively corresponding to the independent cooling circuits and being disposed in the nacelle. The coolant is circulated through the lower cooling circuit using a coolant pump disposed at a bottom of the tower. The upper cooling circuit carries heat from the heat generating components and from the air inside the nacelle to the reservoir. The lower cooling circuit carries heat from the reservoir to the bottom of the tower and dissipates the heat to the sea water through a heat exchanger that is cooled by the sea water and a sea water pump that circulates sea water through the heat exchanger.

The present invention according to another aspect provides a method of cooling the air inside a nacelle and the heat generating components housed in the nacelle in an offshore wind turbine the wind turbine having an upper cooling circuit and a lower cooling circuit that each share a reservoir disposed between them, the reservoir having a lid. The method includes the steps of (1) rotating the lid of the reservoir freely about a vertical axis of the reservoir along with inlet and outlet pipes of the upper cooling circuit as the nacelle yaws, the vertical axis of the reservoir being coincident with a yaw axis of the nacelle, (2) circulating coolant through the upper cooling circuit, and (3) carrying heat from the heat generating components and from the air inside the nacelle from the upper cooling circuit through the reservoir and the lower cooling circuit to the bottom of the tower and dissipating the heat to the sea water through a heat exchanger that is cooled by the sea water.

The present invention according to another aspect provides a system to warm the air inside a nacelle and the heat generating components housed in the nacelle before a cold start-up of an offshore wind turbine. An upper cooling circuit is disposed in the nacelle. A reservoir is disposed below the upper cooling circuit and has a lid that freely rotates about a vertical axis of the reservoir along with inlet and outlet pipes of the upper cooling circuit as the nacelle yaws, the vertical axis of the reservoir being coincident with a yaw axis of the nacelle. A lower cooling circuit is disposed below the reservoir. During cold weather conditions sea water is used to warm coolant in the lower cooling circuit, transporting heat from the sea water to the coolant in the reservoir, wherein the upper cooling circuit transports the heat to the wind turbine components in the nacelle to warm them.

Accordingly, the present invention relates to improved systems and methods for cooling the nacelle and the heat generating components of an offshore wind turbine with a provision to warm these components before a cold start-up. The present invention can overcome the above-noted and other drawbacks of the existing methods.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures:

FIG. 3, which includes FIGS. 3A and 3B, shows a close-up view of the coolant reservoir and its freely rotating lid in accordance with an embodiment of the present invention.

Figure 1:
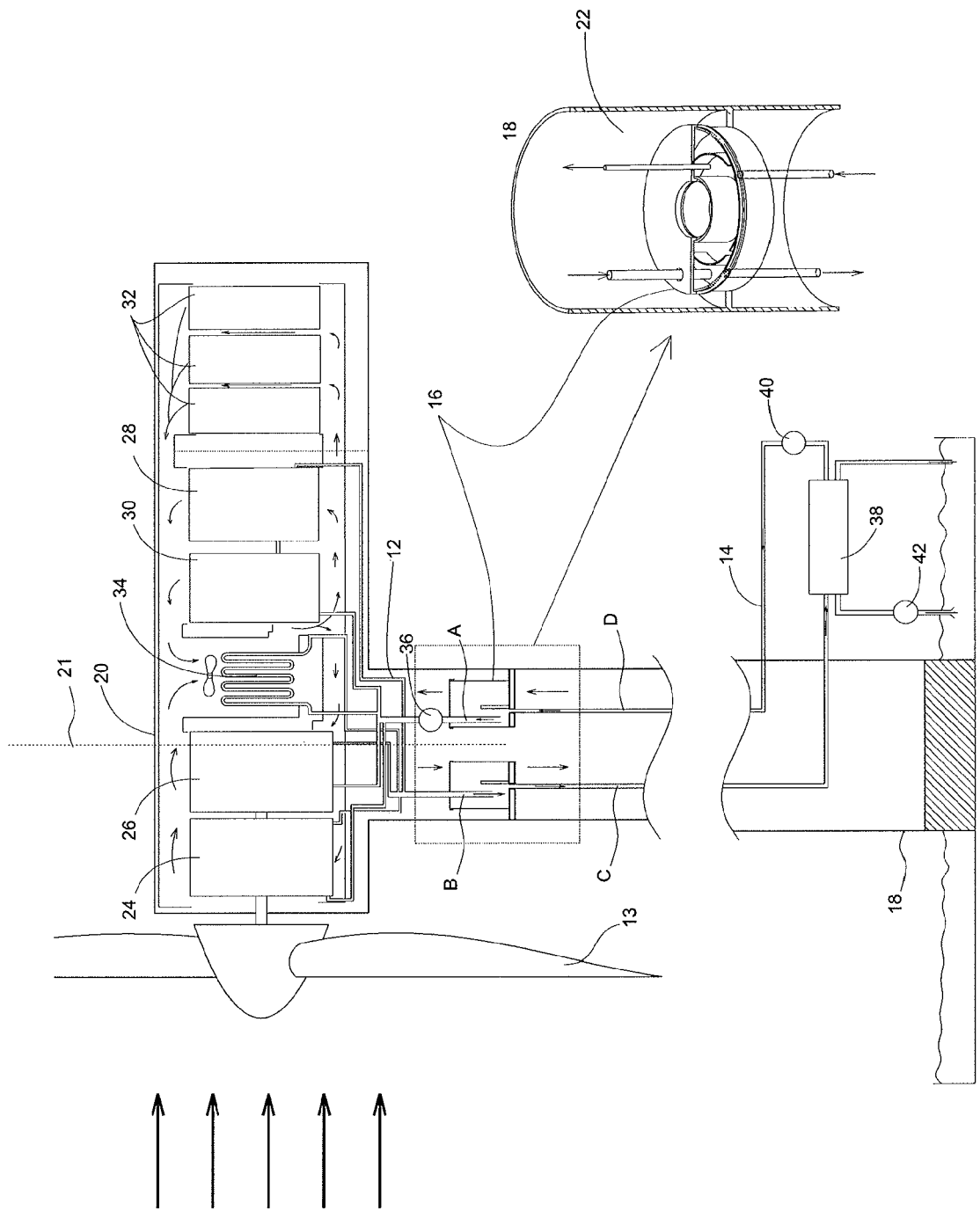
FIG. 1 shows a cooling system for an offshore wind turbine in accordance with an embodiment of the present invention.

The invention will next be described in connection with certain exemplary embodiments; however, it should be clear to those skilled in the art that various modifications, additions, and subtractions can be made without departing from the spirit and scope of the claims.

DETAILED DESCRIPTION OF THE PREFERRED EMBODIMENTS

Generally, the turbine cooling system of an embodiment of the present invention is comprised of two cooling circuits, one upper and one lower, that share a cylindrical reservoir. The reservoir is hollow in the center and is positioned on a platform inside the tower and just below the lower part of the nacelle. The vertical axes of the reservoir and its lid are coincident with the nacelle yaw axis. Notably, the reservoir lid can freely rotate about its axis.

The coolant can be any fluid that is typically used in low temperature heat exchangers, such as a mixture of ethylene glycol and water that does not freeze during a cold weather. The upper cooling circuit carries the heat from the drivetrain, the generator, and other heat generating components, as well as the air inside the nacelle, and transports it to the reservoir. The heat from the air inside the nacelle is dissipated to the upper cooling circuit through a liquid-to-air heat exchanger. The lower cooling circuit then carries the heat from the reservoir to the tower bottom and dissipates it to the sea water through a heat exchanger.

The wind turbine nacelle and the tower are sealed to minimize the air leakage. Moreover, the air inside them is maintained at a slightly higher pressure than the ambient air. The system is a closed airflow system except for a small amount of ambient air treated for water droplets, salt content, and humidity that is introduced into the tower at the bottom to compensate for any air leakage.

The heat flow direction in the cooling circuits can be reversed, if needed, such as before a turbine cold start-up. During severe cold weather conditions, the sea water, which is warmer than the ambient air, can be used to warm up the coolant in the lower cooling circuit and thus transport heat from the sea water to the coolant in the reservoir. The upper cooling circuit then carries the heat to the drivetrain and other components in the nacelle and warms them up. This can reduce the time needed for a turbine cold start-up. The coolant can be additionally heated in either of the cooling circuits by electrical or by other means such as burning a fossil fuel to speed up the turbine cold start-up.

As the nacelle yaws to direct the rotor blades towards the wind direction, the inlet and outlet pipes of the upper cooling circuit freely rotate inside the reservoir along with the reservoir lid. The hollow open space in the center of the reservoir provides an access path for electrical lines, etc., between the nacelle and the tower. Since the sea water is used as a heat sink, and part of the cooling system of the present invention is either attached to or at the bottom of the tower, the system of the present invention can reduce the overall nacelle size and weight.

The following describes more detailed examples of exemplary embodiments of improved systems and methods of the invention for cooling the nacelle and the heat generating components of the offshore wind turbine, and warming them before a cold start-up. It is of course to be understood that the invention is not limited to the examples shown and described, and that various modifications may of course be made that are within the spirit and scope of the invention.

FIG. 1 shows a cooling system 10 for an offshore wind turbine in accordance with an embodiment of the present invention. The system 10 is comprised of two cooling circuits, an upper cooling circuit 12 and a lower cooling circuit 14, that share a cylindrical reservoir 16. The reservoir 16 is hollow in the center and is attached to a platform inside the tower 18 just below the lower part of the nacelle 20. The vertical axes of the reservoir and its lid are coincident with the nacelle yaw axis. Notably, the reservoir lid 22 can freely rotate about its axis. As noted earlier, the coolant can be any fluid that is typically used in low temperature heat exchangers, such as a mixture of ethylene glycol and water that does not freeze during the cold weather.

The nacelle is designed to yaw nearly about the vertical axis of the tower so that the blades are oriented in the direction of the wind. The nacelle can typically rotate back and forth about two full revolutions in either direction (clockwise or anticlockwise looking down from above the turbine). If the coolant were to be brought to the tower bottom, cooled, and returned to the nacelle without a device such as a reservoir with a rotatable lid as proposed in this invention, the coolant pipes would interfere with the nacelle yawing. Even if flexible tubes were used for the coolant flow, the nacelle yawing would cause the tubes to wind and unwind constantly, which could thereby result in tube failure. Moreover, the flexible tubes may not able to handle the static pressure of the coolant due to the significant height of the nacelle from the tower bottom.

The upper cooling circuit 12 carries the heat from the heat generating components, e.g., the drivetrain 24, the electrical generator 26, the converter 28, the hydraulic fluid sump (not shown), and the transformer 32, as well as from the air inside the nacelle 20, and dumps the heat into the reservoir 16. The heat generated by the drivetrain 24 and that by the hydraulic system 30 is dissipated to the coolant through liquid-to-liquid heat exchangers in the lubricating oil and the hydraulic fluid sumps, respectively.

The coolant is circulated through the upper cooling circuit 12 by one or more coolant pumps 36. The heat from the air inside the nacelle 20 is dissipated to the coolant through the air-to-liquid heat exchanger 34. One or more blowers help direct the cooler air exiting this heat exchanger 34 onto the outer surfaces of the drivetrain 24, the generator 26, the converter 28, and the transformer 32, thereby cooling these components from the outside.

Two embodiments are described herein for the upper cooling circuit. In one embodiment, as shown in FIG. 1, the upper cooling circuit uses only one coolant pump 36, and one inlet and one outlet to the reservoir 16. In FIG. 1, the inlet pipe for the upper cooling circuit 12 is labeled A, the outlet pipe for the upper cooling circuit 12 is labeled B, the inlet pipe for the lower cooling circuit 14 is labeled C, and the outlet pipe for the lower cooling circuit 14 is labeled D. After the pump 36, the coolant flow branches and flows through the heat exchangers in the different heat generating components and through the liquid-to-air heat exchanger 34. The warmer coolant outflows from these branches and joins together before flowing into the reservoir 16. The coolant flow rates through the different branches of the circuit can be controlled by flow restriction devices (e.g. electronically controlled hydraulic valves).

Thus, in FIG. 1, the upper cooling circuit 12 contains one flow circuit with branches for the different heat generating components in the nacelle 20. The flow in each of these branches can be adjusted by using flow restriction devices (not shown in the figure). The upper cooling circuit 12 carries the heat from the nacelle 20 to the reservoir 16. The lower cooling circuit 14 then carries the heat from the reservoir 16 to the bottom of the tower 18 and dissipates it to the sea water through a heat exchanger 38.

Figure 2:
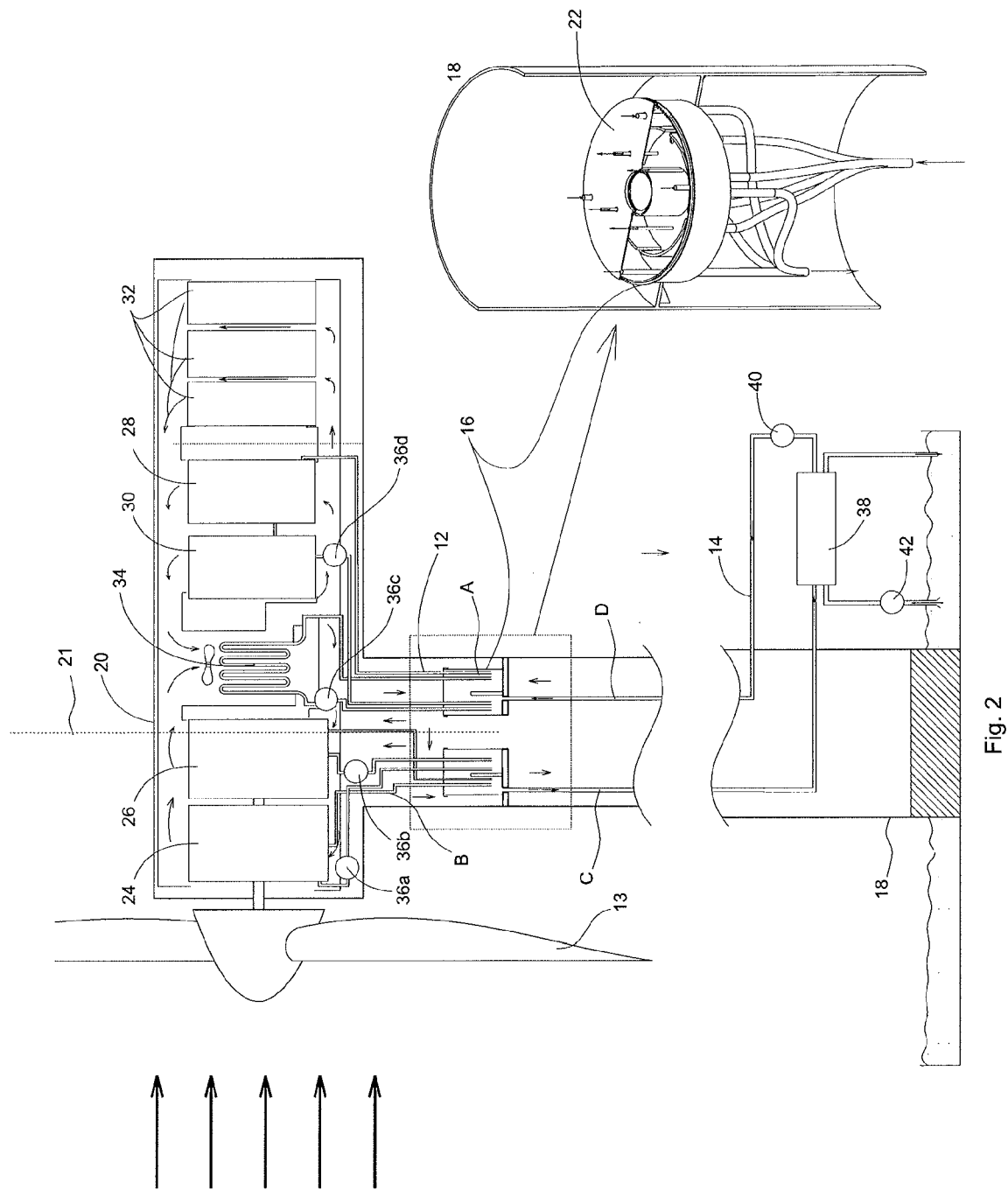
FIG. 2 shows a cooling system for an offshore wind turbine in accordance with an embodiment of the present invention.

In another embodiment, as shown by the system 11 of FIG. 2, the upper cooling circuit is a collection of multiple independent cooling circuits. Each of these circuits has a dedicated coolant pump 36a-d, and a dedicated inlet and a dedicated outlet to the reservoir 16, and carries the heat from one or more heat generating components to the reservoir 16. Thus, the heat from the heat generating components in the nacelle 20 and the air inside the nacelle 20 is removed by the upper cooling circuit 12 and brought into the coolant reservoir 16. The coolant flow rate in each of the circuits is controlled independently and thereby the maximum temperature of the particular heat generating component in that cooling circuit.

The lower cooling circuit 14 carries the heat from the reservoir 16 to the bottom of the tower 18 and dissipates the heat to the sea water through a liquid-to-liquid heat exchanger 38 at the tower bottom. The coolant pump 40 at the tower bottom circulates the coolant in the lower cooling circuit 14. A sea water pump 42 circulates cold sea water through the heat exchanger in an open flow circuit. The coolant rejects the heat to the cold sea water in the heat exchanger 38. The pump 40 helps circulate the coolant in the lower cooling circuit (brings the warm coolant from the reservoir to the heat exchanger 38 and returns the cold coolant back to the reservoir). The pump 42 helps bring the fresh cold sea water to the heat exchanger 38 and carry the warm sea water back to the sea.

Thus, FIG. 2 shows a cooling system for an offshore wind turbine according to another embodiment of the present invention. The upper cooling circuit 12 contains independent flow circuits for each of the heat generating components in the nacelle 20. The upper cooling circuit 12 carries the heat from these components to the reservoir 16. The lower cooling circuit 14 then carries the heat from the reservoir 16 to the tower 18 bottom and dissipates it to the sea water through a heat exchanger 28. In FIG. 2, the inlet pipes for the upper cooling circuit 12 are labeled A, the outlet pipes for the upper cooling circuit 12 are labeled B, the inlet pipe for the lower cooling circuit 14 is labeled C, and the outlet pipe for the lower cooling circuit 14 is labeled D.

Figure 2A:
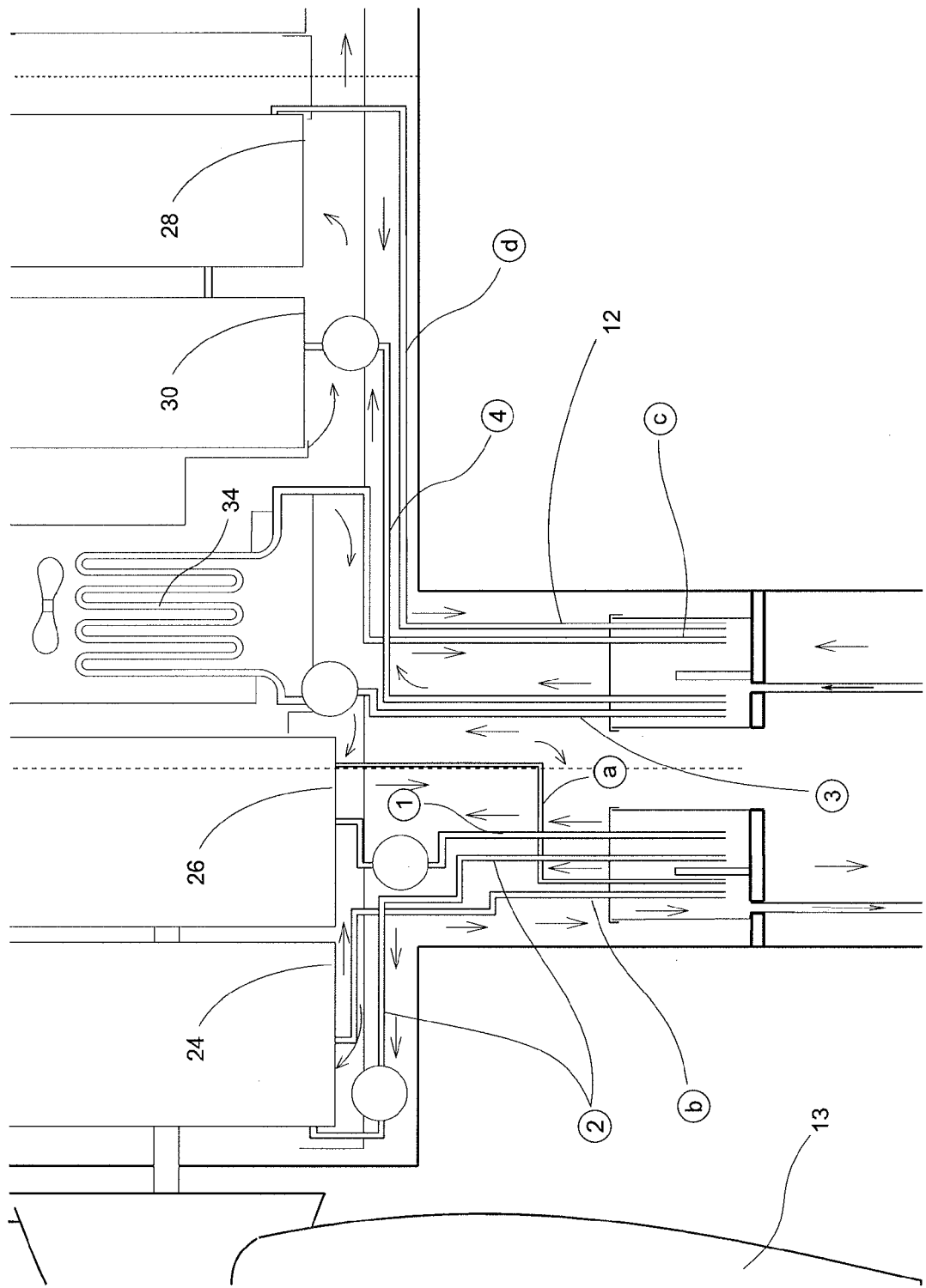
FIG. 2A shows a partial expanded version of FIG. 2.

FIG. 2A shows a partial expanded version of FIG. 2. In FIG. 2A, the inlet pipes of the upper cooling circuit 12, connecting the reservoir 16 to the pumps, are labeled 1, 2, 3, and 4. Specifically, the inlet pipe for the generator 26 is labeled 1, the inlet pipe for the gear box 24 is labeled 2, the inlet pipe for the heat exchanger 34 is labeled 3, and the inlet pipe for the converter 28 and the hydraulics 30 is labeled 4. Also in FIG. 2A, the outlet pipes for the upper cooling circuit 12 into the reservoir 16 are labeled a, b, c, and d. Specifically, the outlet pipe for the generator 26 is labeled a, the outlet pipe for the gear box 24 is labeled b, the outlet pipe for the heat exchanger 34 is labeled c, and the outlet pipe for the converter 28 and the hydraulics 30 is labeled d.

It is noted that the vertical axes of the reservoir 16 and its lid 22 are coincident with the nacelle yaw axis 21. The reservoir lid 22 can also freely rotate about its axis. As the nacelle 20 yaws to direct the rotor blades 13 towards the wind direction, the inlet and outlet pipes of the upper cooling circuit 12 freely rotate inside the reservoir 16 along with the reservoir lid 22. Moreover, the coolant inlets and outlets in the reservoir 16 can be judiciously located such that the coolant outlet of the lower cooling circuit 14 is closer to the coolant inlet of the upper cooling circuit 12, and the coolant outlet of the upper cooling circuit 12 is closer to the coolant inlet of the lower cooling circuit 14. This ensures that the upper cooling circuit carries the cold coolant to the heat generating components in the nacelle and the lower cooling circuit carries the warm coolant to the tower bottom for rejecting the heat to the sea water.

As noted earlier, the hollow open space in the center of the reservoir 16 provides an access path for electrical lines, etc., between the nacelle 20 and the tower 18. Since the sea water is used as a heat sink and the majority of the components that help dissipate the heat generated by the turbine are either attached to or at the bottom of the tower 18, the system of the present invention can reduce the overall nacelle size and weight.

The wind turbine nacelle 20 and the tower 18 are sealed to minimize the air leakage. Moreover, the air inside them is maintained at a slightly higher pressure than the ambient air. It is a closed airflow system except for a small amount of ambient air treated for water droplets, salt content, and humidity that is introduced into the tower 18 at the bottom to compensate for any air leakage (not shown in the figures).

Notably, the heat flow direction in the cooling circuits can be reversed, if needed, such as before a turbine cold start-up. During severe cold weather conditions, the sea water, which is warmer than the ambient air, can be used to warm up the coolant in the lower cooling circuit 14 and thereby transport heat from the sea water to the coolant in the reservoir 16. The upper cooling circuit then carries the heat to the drivetrain 24 and other components in the nacelle 20 and warms them up. This can reduce the time needed for a turbine cold start-up. The coolant can be additionally heated in either of the cooling circuits 12, 14 by electrical or other means to speed up the turbine warm up process before a cold start.

As noted previously, the heat generated by the drivetrain 24 and that by the hydraulic components 30 is transferred to the coolant in the upper cooling circuit through liquid-to-liquid heat exchangers in the lubricating oil and hydraulic fluid sumps, respectively, and transported to the coolant reservoir 16. Alternately, the lubricating oil (that cools the drivetrain) and the fluid used in the hydraulic system for blade pitching and nacelle yawing can be cooled by circulating them through independent liquid-to-liquid heat exchangers (not shown in the figures) that are immersed vertically into the coolant in the reservoir. The only requirement in this case is that these heat exchangers be shaped such that they are free to rotate inside the reservoir 16 when the nacelle 20 yaws.

FIG. 3 shows a close-up view of the coolant reservoir 16 and its freely rotating lid 22. The coolant inlet and outlet tubes of the upper cooling circuit 12 rotate freely inside the reservoir 16 as the nacelle 20 yaws to direct the blades 13 towards the wind direction. In FIG. 3, the inlet pipe for the upper cooling circuit 12 is labeled A, the outlet pipe for the upper cooling circuit 12 is labeled B, the inlet pipe for the lower cooling circuit 14 is labeled C, and the outlet pipe for the lower cooling circuit 14 is labeled D. It is noted that the axis of symmetry 23 of the reservoir 16 is nearly coincident with the nacelle yaw axis 21.

The turbine cooling system as shown in FIG. 1 is such that the coolant in the lower cooling circuit 14 is cooled in a liquid-to-liquid heat exchanger 38 by an open flow sea water system. Alternately, the coolant in the lower cooling circuit 14 can be cooled by a heat exchanger that is directly immersed into the sea water (not shown). In this latter case, a larger heat exchanger is most likely needed because of the lower heat transfer coefficient on the sea water side. Moreover, provisions are needed to ensure that no marine growth occurs on the heat exchanger immersed in the sea water.

In both offshore and onshore wind turbines, an air cooled radiator at the tower bottom can also be used to cool the warm coolant in the lower cooling circuit. A main advantage of using an air cooled radiator near the tower bottom is to reduce the nacelle size and weight. Alternately, the lower cooling circuit can also be connected to a geothermal cooling and heating system.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Having described the invention, what is claimed as new and secured by Letters Patent is:

1. A system to cool air inside a nacelle and heat generating components housed in the nacelle of an offshore wind turbine, comprising:
   an upper cooling circuit in the nacelle having at least one upper inlet pipe and at least one upper outlet pipe sharing a reservoir with a lower cooling circuit having a lower inlet pipe and a lower outlet pipe;
   wherein the reservoir is disposed below the upper cooling circuit and has a lid that freely rotates about a vertical axis of the reservoir along with the at least one upper inlet pipe and the at least one upper outlet pipe of the upper cooling circuit as the nacelle yaws, the vertical axis of the reservoir being coincident with a yaw axis of the nacelle;
   wherein the lower cooling circuit is disposed below the reservoir,
   wherein
   coolant is circulated through the upper cooling circuit using a cooling pump disposed in the nacelle,
   the at least one upper outlet pipe of the upper cooling circuit carries heat from the heat generating components and from the air inside the nacelle to the reservoir, and
   the lower inlet pipe of the lower cooling circuit carries the heat from the reservoir to the wind turbine tower bottom and dissipates the heat to the sea water through a heat exchanger that is cooled by the sea water.

2. The system as set forth in claim 1, further comprising another heat exchanger disposed inside the nacelle to dissipate the heat from the air inside the nacelle to the coolant.

3. The system as set forth in claim 1, wherein the upper cooling circuit has a single upper inlet pipe and a single upper outlet pipe connected to the reservoir.

4. The system as set forth in claim 1, wherein the reservoir has a doughnut shape so that there is an open space for providing an access path for electrical lines between the nacelle and the tower bottom.

5. The system as set forth in claim 1, wherein the nacelle and the tower are sealed to minimize air leakage, and air inside the nacelle and the tower is maintained at a slightly higher pressure than ambient air.

6. The system as set forth in claim 1, further comprising a sea water cooled heat exchanger disposed at the bottom of the tower to cool the coolant in the lower cooling circuit.

7. The system as set forth in claim 1, wherein during cold weather conditions the heat flow direction in the upper and lower cooling circuits is reversed and the sea water is used to warm the coolant in the lower cooling circuit, transporting heat from the sea water to the coolant in the reservoir, wherein the upper cooling circuit transports the heat to the heat generating components to warm them before a cold start-up of the turbine.

8. A system to cool air inside a nacelle and heat generating components housed in the nacelle of an offshore wind turbine, comprising:
   an upper cooling circuit disposed in the nacelle and being comprised of a plurality of independent cooling circuits each having an inlet pipe and an outlet pipe sharing a reservoir with a lower cooling circuit having a lower inlet pipe and a lower outlet pipe;
   wherein the reservoir is disposed below the upper cooling circuit and has a lid that freely rotates about a vertical axis of the reservoir along with the inlet and outlet pipes of the upper cooling circuit as the nacelle yaws, the vertical axis of the reservoir being coincident with a yaw axis of the nacelle;
   wherein the lower cooling circuit is disposed below the reservoir,
   wherein
   coolant is circulated through the upper cooling circuit using a plurality of cooling pumps respectively corresponding to the independent cooling circuits and being disposed between the nacelle and the upper cooling circuit,
   the coolant is circulated through the lower cooling circuit using a coolant pump disposed at a bottom of the tower;
   the outlet pipes of the plurality of independent cooling circuits of the upper cooling circuit carry heat from the heat generating components and from the air inside the nacelle to the reservoir, and
   the lower inlet pipe of the lower cooling circuit carries the heat from the reservoir to the bottom of the tower and dissipates the heat to the sea water through a heat exchanger that is cooled by the sea water and a sea water pump that circulates sea water through the heat exchanger.

9. The system as set forth in claim 8, further comprising another heat exchanger disposed inside the nacelle to dissipate the heat from the air inside the nacelle to the coolant.

10. The system as set forth in claim 8, wherein the reservoir has a doughnut shape so that there is an open space for providing an access path for electrical lines between the nacelle and the bottom of the tower.

11. The system as set forth in claim 8, wherein the nacelle and the tower are sealed to minimize air leakage, and air inside the nacelle and the tower is maintained at a slightly higher pressure than ambient air.

12. The system as set forth in claim 8, further comprising a sea water cooled heat exchanger disposed at the bottom of the tower to cool the coolant in the lower cooling circuit.

13. The system as set forth in claim 8, wherein during cold weather conditions the heat flow direction in the upper and lower cooling circuits is reversed and the sea water is used to warm coolant in the lower cooling circuit, transporting heat from the sea water to the coolant in the reservoir, wherein the upper cooling circuit transports the heat to the heat generating components to warm them before a cold start-up of the turbine.

14. A method for cooling air inside a nacelle and heat generating components housed in the nacelle of an offshore wind turbine, the wind turbine comprising a tower and an upper cooling circuit having at least one upper inlet pipe and at least one upper outlet pipe that shares a reservoir with a lower cooling circuit having a lower inlet pipe and a lower outlet pipe, wherein the reservoir is disposed between the upper and lower cooling circuits and has a lid, the method comprising the steps of:
   rotating the lid of the reservoir freely about a vertical axis of the reservoir along with the at least one upper inlet pipe and the at least one upper outlet pipe of the upper cooling circuit as the nacelle yaws, the vertical axis of the reservoir being coincident with a yaw axis of the nacelle;
   circulating coolant through the upper cooling circuit;
   carrying heat from the heat generating components and from the air inside the nacelle by the at least one upper outlet pipe of the upper cooling circuit to the reservoir;
   carrying the heat from the reservoir by the lower inlet pipe of the lower cooling circuit to a bottom of the tower of the wind turbine;
   and dissipating the heat through a heat exchanger that is cooled by sea water.

15. The method of claim 14, in which said circulating step includes circulating the coolant through the upper cooling circuit using a cooling pump disposed between the nacelle and the upper cooling circuit.

16. The method of claim 14, in which said circulating step includes circulating the coolant through the upper cooling circuit using a plurality of cooling pumps respectively corresponding to inlet and outlet pipes of the upper cooling circuit and being disposed between the nacelle and the upper cooling circuit.

17. The method of claim 14, further comprising the step of circulating the coolant in the lower cooling circuit using a coolant pump disposed at the bottom of the tower.

18. The method as set forth in claim 14, further comprising the steps of, during cold weather conditions, reversing the heat flow direction in the upper and lower cooling circuits using the sea water to warm the coolant in the lower cooling circuit, transporting heat from the sea water to the coolant in the reservoir, and transporting the heat from the reservoir through the upper cooling circuit and to the heat generating components to warm them before a cold start-up of the turbine.

19. A system to warm air inside a nacelle and heat generating components housed in the nacelle before a cold start-up in an offshore wind turbine that is housed in a tower, the system comprising:
   an upper cooling circuit disposed in the nacelle having at least one upper inlet pipe and at least one upper outlet pipe sharing a reservoir with a lower cooling circuit having a lower inlet pipe and a lower outlet pipe;
   wherein the reservoir is disposed below the upper cooling circuit and has a lid that freely rotates about a vertical axis of the reservoir along with the at least one upper inlet pipe and the at least one upper outlet pipe of the upper cooling circuit as the nacelle yaws, the vertical axis of the reservoir being coincident with a yaw axis of the nacelle;
   wherein the lower cooling circuit is disposed below the reservoir,
   wherein during cold weather conditions sea water is used to warm coolant in the lower cooling circuit, transporting heat from the sea water to the coolant in the reservoir, wherein the upper cooling circuit transports the heat to the heat generating components to warm them.

20. The system as set forth in claim 19, further comprising means for additionally heating the coolant in at least one of the upper and lower cooling circuits to speed up the cold start-up of the turbine.

* * * * *